Figure 5:
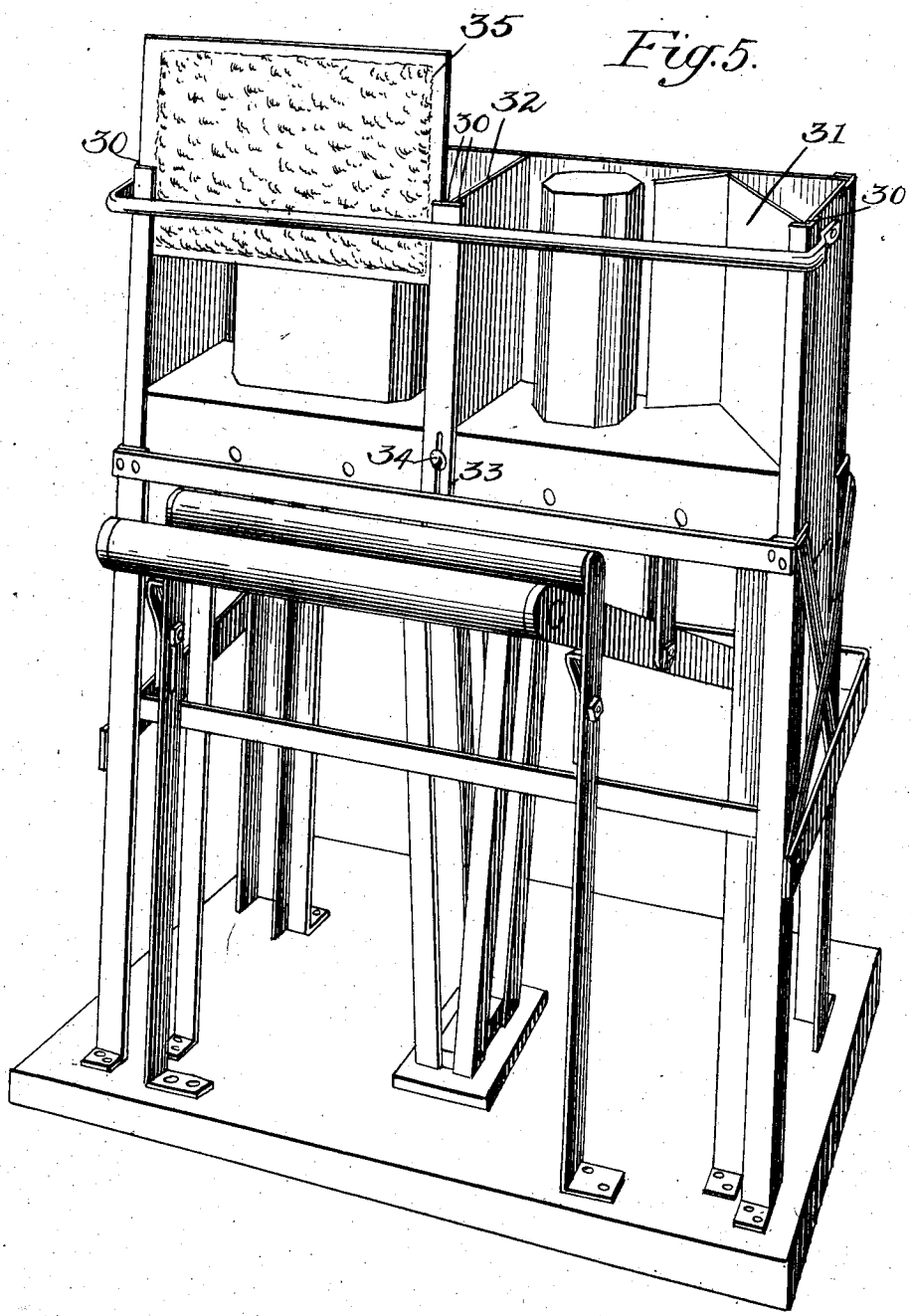

No. 834,632. PATENTED OCT. 30, 1906.
A. NELSON.
APPARATUS FOR MOLDING BUILDING BLOCKS.
APPLICATION FILED FEB. 23, 1906.
3 SHEETS—SHEET 1.
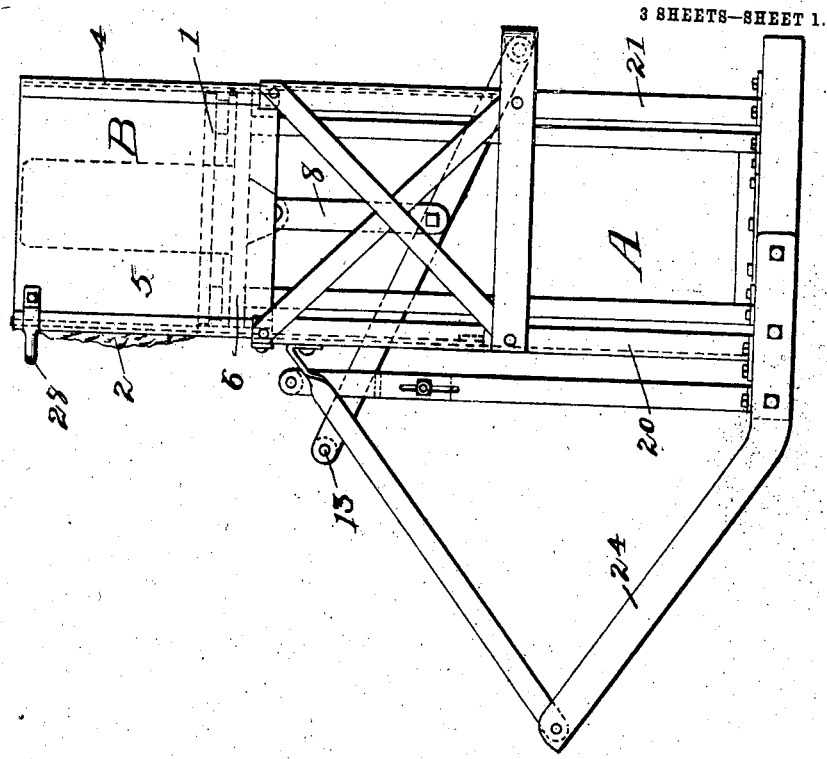
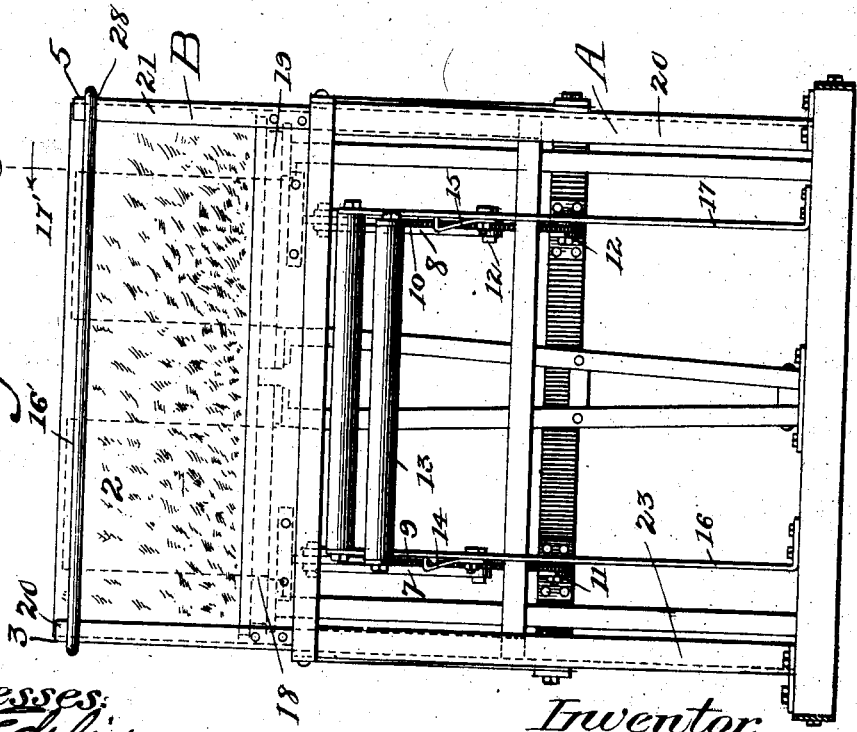
Witnesses
Inventor
Andrew Nelson No. 834,632. PATENTED OCT. 30, 1906.
A. NELSON.
APPARATUS FOR MOLDING BUILDING BLOCKS.
APPLICATION FILED FEB. 23, 1906.
3 SHEETS—SHEET 2.
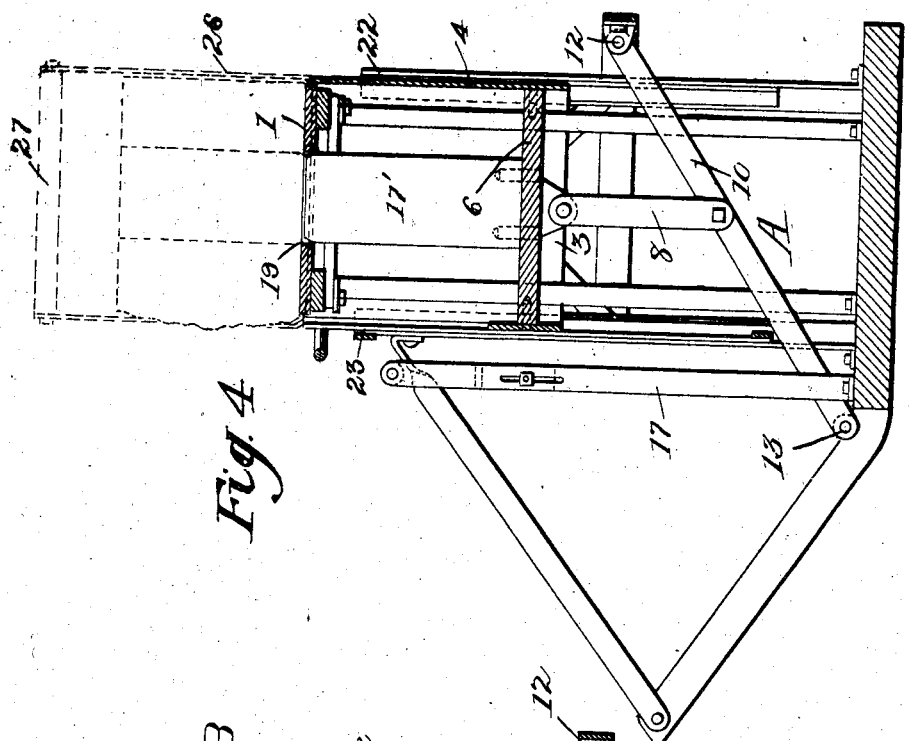
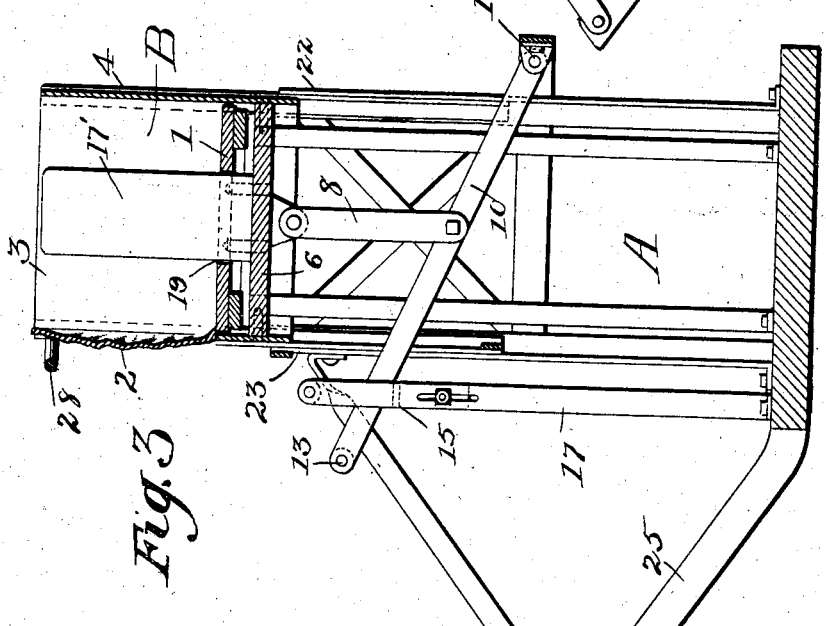
Witnesses:
Inventor:

No. 834,632. PATENTED OCT. 30, 1906.
A. NELSON.
APPARATUS FOR MOLDING BUILDING BLOCKS.
APPLICATION FILED FEB. 23, 1906.

3 SHEETS—SHEET 3.

Witnesses:
D. W. Edelin.
R. L. Court.

Inventor.
Andrew Nelson,
by Pennie & Goldsborough
Attys

UNITED STATES PATENT OFFICE.

ANDREW NELSON, OF ROCK ISLAND, ILLINOIS.

APPARATUS FOR MOLDING BUILDING-BLOCKS.

No. 834,632.                  Specification of Letters Patent.                  Patented Oct. 30, 1906.

Application filed February 23, 1906. Serial No. 302,477.

*To all whom it may concern:*

Be it known that I, ANDREW NELSON, a citizen of the United States, residing at Rock Island, county of Rock Island, State of Illinois, have invented certain new and useful Improvements in Apparatus for Molding Building-Blocks; and I do hereby declare the following to be a full, clear, and exact description of the invention, such as will enable others skilled in the art to which it appertains to make and use the same.

The invention relates to means for forming cement building-blocks.

One object of my invention is to enable the making of building-blocks of the character described to be carried on with greater ease and rapidity than heretofore.

Another object of the invention is to provide apparatus which permits of ready adjustment and interchange of parts, so that a great variety of shapes and forms of blocks can be produced in the same machine.

It is a further object of the invention to provide means of the character described whereby there will be small liability of breakage, crumbling, or waste in manufacturing and removing the blocks.

The invention can be best explained in connection with the accompanying drawings, of which—

Figure 1 is a side elevation of a machine embodying the invention. Fig. 2 is an end elevation of the same. Fig. 3 is a vertical section on the line 3 3 of Fig. 1 looking in the direction of the arrow, the apparatus being shown in position for molding a block. Fig. 4 is a similar section, but with the molding-box moved to a position so that the molded block may be removed from the apparatus; and Fig. 5 is a perspective view of a machine, some details being modified.

Referring to the drawings, the apparatus comprises a frame A, upon which is supported the mold B.

The mold-box comprises a bottom plate 1, which is supported in stationary position upon the frame A during the operation of molding, and vertical sides 2, 3, 4, and 5, which may be connected with a suitable framework 6, pivotally secured by links 7 and 8 to the levers 9 and 10, pivoted to the frame A at 11 and 12, their outer ends being joined by a bar 13, which serves as a handle for raising and lowering the sides and core of the mold, as will be hereinafter set forth. The levers may be held in raised position by means of spring-catches 14 and 15, which are adjustably secured upon the uprights 16 and 17, fixed to the frame A. Secured to the framework 6, which carries the sides of the mold, and adapted to move therewith, are the cores 16' and 17', which extend through holes 18 and 19 in the bottom plate 1. These cores may be hollow, if desired. The vertical corners of the mold formed by the sides fit closely within the angular guides 20, 21, 22, and 23, so that the sides are properly directed in their vertical movement.

Where it is desired to produce a block having plain faces, the sides of the mold may be secured to the framework 6 and all of them move vertically together. It may be, however, that it is desired to make one of the faces appear rough, like that of stone, or have other irregular configuration, in which case an irregular side plate would be provided, as shown most plainly in Figs. 2 and 3. It is obvious that such a plate could not be moved vertically without destroying the face of the block, and therefore in such a case the remainder of the sides of the mold are made movable independently of the irregular side, as well as of the bottom plate. This may be accomplished by making the bottom of the irregular plate somewhat wider than the plain ones, so that it will be caught upon the bottom plate of the mold as the remainder of the sides are moved downwardly. This irregular plate is held in proper relation to the other sides by having its end fit in grooves, as 30, in those sides. While this prevents the irregular plate from moving laterally with relation to the others, independent vertical movement is permitted.

It will be obvious that the construction above described with reference to one irregular plate can be extended to more than one to produce a plurality of irregular faces upon the block.

The rockers 24 and 25 project laterally at an angle from the base of the frame A. By exerting pressure upon either or both of these rockers the frame may be rocked and the mold tilted, which greatly facilitates the filling of the mold and tamping of the filling material.

To facilitate the removal of the molded block without touching the same, the framework of the machine is so constructed that rods or other lifting means, as a bent rod 26, provided with a handle 27, may be applied beneath the bottom plate 1 and the plate removed with the molded block. Preferably the bottom plate is provided with grooves at each end for the reception of the lifting means, so that the latter will not slip, but will be held in proper relation to the molding-block. By this means the touching of the molded block to effect its removal from the machine is rendered unnecessary and the consequent crumbling and breakage of the block is avoided.

A rod 28 may be provided to keep the sides of the mold from spreading, and this may also serve as a handle for tilting the apparatus upon the rockers.

The operation of the machine is as follows: The handle 13 having been raised to its upper position and secured by the catches 14 and 15, the sides and cores of the mold will be raised and occupy positions, as shown in Figs. 1, 2, and 3. The machine may then be tilted upon its rockers by pulling upon the handle 28, and the cement or other material of which the building-block is to be constructed is filled into the mold and tamped. Where hollow cores are employed, they may be filled with loose material, so as to give a spring for packing and leveling with a shovel or clapboard. Having filled the mold and tamped the material therein, the levers 9 and 10 are released, and the frame 6, with its attached side plates and cores, is moved to its lower position, as shown in Fig. 4. As before stated, if all of the sides of the mold are plain they may all move with the framework 6 to its lower position. This leaves the formed block upon the bottom plate 1, and the whole may be removed by placing the lifters 26 beneath the bottom plate and lifting it and with it the block from the machine, and the block may then be placed in any desired location for drying. Where irregular side plates are used, they do not, as above set forth, move downwardly with the other sides, but remain with the block and bottom plate and may be removed therewith. A block and bottom plate having been removed, a new bottom plate is placed in position upon the frame and the sides and core raised into molding position, as before described, irregular side plates, if used, being placed in position, as before described.

Of course if the blocks are to be made solid the cores would be omitted and the holes in the bottom plate stopped.

If it should be desired to mold several blocks at once, partitions may be secured to the bottom plate at proper points to effect the desired division or divisions, the sides of the mold moving independently of the partitions as they do of the bottom, but making a sufficiently close fit therewith to prevent passage of material between the same. In the same manner the blocks may be made with beveled or angular corners or with other configuration by suitably placing partitions, as 31, (see Fig. 5,) upon the bottom plate.

Where it is desired to make two blocks with configured faces, the expedient of placing partitions upon the bottom, as before referred to, is not practicable. In the last case, therefore, a specially made partition, as 32, (see Fig. 5,) is provided having grooves upon each side for the reception of the irregular face-plates, which is secured to the frame of the machine by means of a projection 33 and a screw 34 or other suitable means. The ends of the irregular plates, as 35, opposite to those which enter grooves in the partition 32 enter similar grooves in the ends of the mold, as before described.

If it be desired to make a thin veneer block, it is obvious that this might be done by filling the mold to the extent necessary to produce the desired thickness of block. If it is desired that the face of the block shall be plain, it is simply necessary to remove the cores and stop the holes in the bottom plate 1; but if, on the other hand, it is desired to produce a veneer block with a configured face the cores are removed, as before, and an irregular bottom plate is substituted for the plain bottom plate 1 and the material is filled in the mold to the desired thickness, the other operations being carried out as before described and the irregular bottom plate being removed with the molded block, as is the plain bottom plate 1.

The tilting of the machine is of a special utility in connection with the formation of blocks the bodies of which are of one material and the faces are of another. This construction is most widely used in connection with blocks having configured faces. In forming such blocks with the machine described the apparatus is tilted and the material of which the face is formed is filled in on the lower side, and owing to the fact that this side has by the tilting been moved from the vertical into a more or less horizontal position the material of the face will remain where placed. The back or body of the block can then be filled in with other material in an obvious manner.

While the invention has been illustrated by a structure which is admirably adapted to carry it into effect, it is to be understood that the structure is illustrative merely and that the invention could be embodied in different structures without departing from its spirit. It should not, therefore, be limited to the structure shown.

What I claim is—

1. In an apparatus for molding blocks, the combination with a bottom plate for the mold, of sides vertically movable with relation to the bottom plate, a relatively fixed side for said mold, and a rod connecting the vertically-movable sides for permanently holding them in proper position and preventing the same from spreading.

2. In an apparatus for molding blocks, the combination with a frame, of a stationary bottom plate for the mold resting upon said frame, vertically-movable sides for said mold about said bottom plate, levers pivoted to said frame and also secured to said sides for moving the sides vertically with relation to the bottom plate, and devices coöperating with said levers for holding the sides at different raised positions.

3. In an apparatus for molding blocks, the combination with a frame, of a stationary bottom plate for the mold resting upon said frame, vertically-movable sides for said mold about said bottom plate, levers pivoted to said frame and also secured to said sides for moving the sides vertically with relation to the bottom plate, uprights fixed to the frame, and catches mounted on said uprights and serving to coöperate with said levers for holding the sides in raised position.

4. In an apparatus for molding blocks, the combination with a frame, of a stationary bottom plate for the mold resting upon said frame, vertically-movable sides for said mold about said bottom plate, levers pivoted to said frame and also secured to said sides for moving the sides vertically with relation to the bottom plate, uprights fixed to the frame, and catches adjustable upon the uprights and serving to coöperate with said levers for holding the sides in different raised positions.

5. In an apparatus for molding blocks, the combination with a frame, of a bottom plate for the mold, vertically-movable sides for said mold about said bottom plate, a relatively fixed side for said mold, rockers on said frame for tilting the mold, and a rod connecting the vertically-movable sides for permanently holding them in proper position and preventing the same from spreading, said rod also serving as a handle for tilting the apparatus upon the rockers.

6. In an apparatus for molding blocks, the combination with a frame, of a bottom plate for the mold, vertically-movable sides for said mold having grooves therein, a partition for said mold secured to the frame and having grooves upon each side thereof, and face-plates fitting in the grooves of the vertically-movable sides and said partition, and held in proper relation to said sides for forming the blocks.

In testimony whereof I affix my signature in presence of two witnesses.

ANDREW NELSON.

Witnesses:
JOHN J. INGRAM,
E. D. SWEENEY.